Nov. 15, 1955   W. GRETENER   2,723,770
DEVICE FOR THE STORAGE OF PIECE GOODS
Filed Feb. 17, 1953
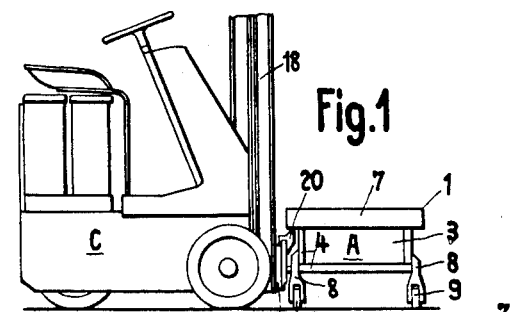
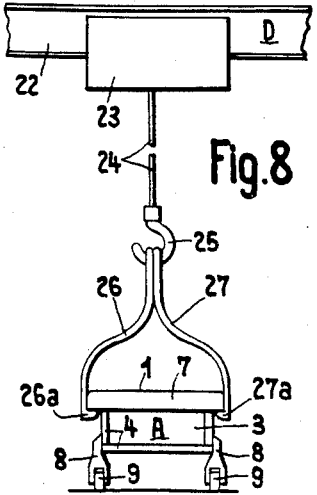
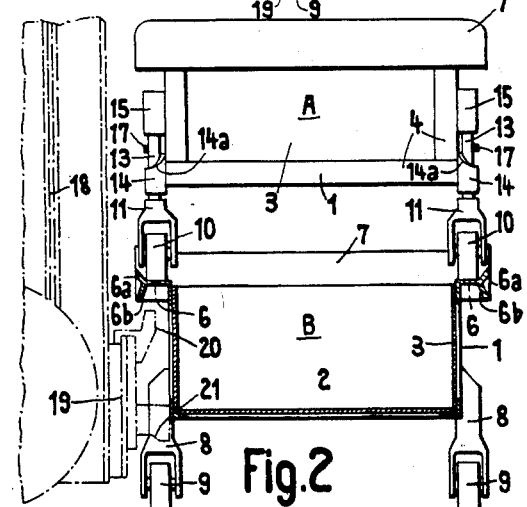
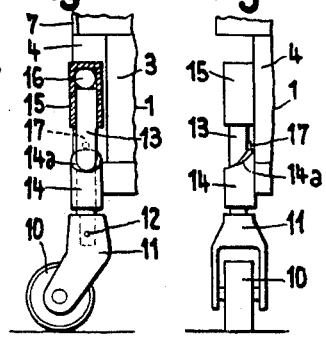
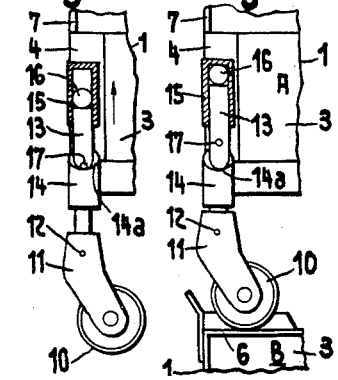
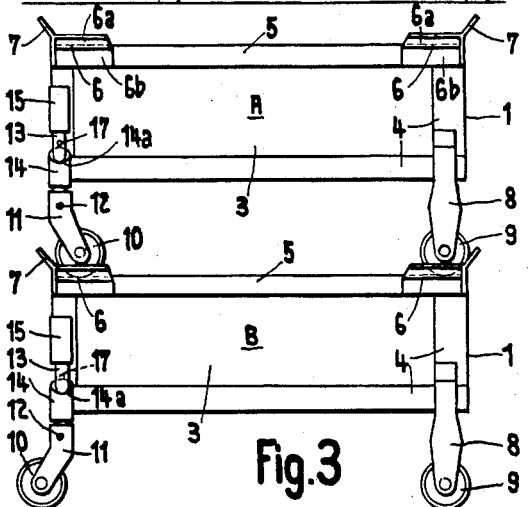
INVENTOR
Walter Gretener
BY
Edward P. Connors
ATTORNEY

United States Patent Office 2,723,770
Patented Nov. 15, 1955

2,723,770
DEVICE FOR THE STORAGE OF PIECE GOODS

Walter Gretener, Thalwil, Switzerland, assignor to A. & R. Wiedemar, Bern, Switzerland Application February 17, 1953, Serial No. 337,349

3 Claims. (Cl. 214—515)

This invention concerns a device for the storage of piece goods.

This device includes piece goods transport containers having rollers and upper rests adapted to support the rollers of another transport container of similar construction to be placed onto the lower transport container in stacked relationship. A lifting device is adapted to cooperate with attachments provided at the side of each transport container in order to lift, to move sidewise, and to lower a transport container carried by the lifting device.

In accordance with the teaching of the invention, the handling and stacking of the transport containers requires a minimum of space.

The portable transport containers are preferably provided with two oppositely arranged pairs of rollers, the rollers of one pair being turnable inwardly when placing said one pair of rollers onto another transport container in order to minimize the required length of the rests of the other or lower transport container. Preferably the turning inwardly of the said rollers is effected by automatically operated control means adapted to allow a subsequent turning outwardly of the said rollers.

The device according to the invention will be described below by way of example with special reference to the attached drawing in which Fig. 1 shows in side elevation an electric trolley with a sliding support at its front forming the lifting device, and a transport container placed in front of the sliding support in position to be lifted, Fig. 2 shows a side elevation corresponding to that of Fig. 1 on a larger scale, wherein two transport containers are stacked on each other, the lower one being shown in section, Fig. 3 is a view from the right of Fig. 2, Fig. 4 is an elevation of one of the turnable rollers of the transport container in its normal position, Fig. 5 is a view partially in section from the left of Fig. 4, Fig. 6 is a view corresponding to Fig. 5, the roller being shown in its lower position, Fig. 7 is a view corresponding to Fig. 6, the roller being shown in its normal position, and Fig. 8 shows a part of a hoist forming the lifting device and a transport container ready to be lifted.

The device for the storage of piece goods includes a number of similar portable transport containers serving for the same purpose. As may be seen on the drawing the transport containers 1 are of rectangular shape having a bottom 2 and four sides 3 which are made of sheet metal and are held together by a frame 4. The upper longitudinal sides 5 of the frame are formed with a rest 6 at each end and having stop bars 7 attached to the outer ends of the rests 6. The rests 6 are part of the above mentioned frame 4 and the stop bars extend above laterally inclined portions 6a of the rests 6. Vertical supports 8 carrying each a roller 9 are attached at opposite sides of one end of the transport container to the frame 4. The two rollers 9 are thus mounted on the transport container 1 in a fixed relative position. At the other end of the transport container 1 are mounted two rollers 10 each connected to a vertical shaft 13 by means of an arm 11 and a pin 12. The shafts 13 are each held by two spaced coaxial bearings 14 and 15 attached at the ends of the longitudinal side of the transport container 1. The bearings 15 each have a cover forming a thrust face for a ball 16 placed between the shaft 13 and the said cover. A stop 17 mounted on the shaft 13 between the bearings 14 and 15 cooperates with a control cam 14a formed on the lower bearing 14.

When both pairs of rollers 9 and 10 of the above described transport container 1 are standing on the ground the weight of the container is carried by the turnable rollers 10 through the above mentioned bearings 15 as well as by the rollers 9, the shafts 13 are moved upwardly in the upper bearings 15 (Figs. 4 and 5). If by any means the transport container 1 is lifted vertically the shafts 13 together with the rollers 10 slide downwardly by gravity. During this sliding movement of the shafts 13 the stops 17 mounted on these shafts slide along the control cam 14a to the lower end thereof so that the shafts 13 are turned in their bearings 14 and 15. This rotatory movement of the shafts 13 results in a corresponding rotation of the arms 11 and in a turning inwardly of the rollers 10. In sliding along the whole length of the control cam, the shafts 13 are each turned through an angle of 180°. By the above described rotatory movement of the shafts 13 and the arms 11 the rollers are changed from the position shown in Fig. 5 into the position shown in Fig. 6 relative to the transport container. With the rollers 10 turned inwardly the pairs of rollers 9 and 10 of the transport container A may be placed onto another transport container B as shown in Figures 2, 3 and 7. While setting the transport container A onto the transport container B the shafts 13 of the rollers 10 automatically slide in the bearings 14 and 15, in other words the container 1 will be lowered until the cover of the upper bearings 15 and the ball 16 firmly seat on the upper end of the shaft 13. The stops 17 have now reached a height corresponding to the height of the upper end of the control cam 14a of the lower bearing 14, but the stops 17 do not contact the control cam 14a.

If the upper transport container A is lifted again in order to put it on the floor, the shafts 13 of the turnable rollers 10 slide downwardly in their bearings 14 and 15. On reaching the floor, the rollers 10 again push the shafts 13 upwardly in their bearings 14 and 15 until the transport container seats on the upper ends of the shafts 13 which are supported by the rollers 10. If the transport container is now driven away on its rollers 9 and 10, the rollers 10 may again be turned outwards when moving the transport container in a certain direction (e. g. to the right in Fig. 3), thus increasing the base of stand and the stability of the container.

An electric lift C (schematically shown in Figs. 1 and 2) may be used for lifting and lowering the transport containers 1. Vertical slide rails 18 are fixed at the front of the lift and a support 19 is slideably mounted on the slide rails. The support 19 is raised and lowered by the motor of the electric lift C by means of a suitable transmission gear (not shown in the drawing). The support 19 replaces the lifting fork normally provided at the front of the electric lift. The support 19 has (instead of the two fork arms of the lifting fork) two upper rams 20 and two lower projections 21. The rams 20 are adapted to cooperate with the undersides of two rests 6 positioned at the same side of the transport container 1 whereas the buffers 21 form lateral support faces or thrusts for the containers 1. As shown in Fig. 2 the rests 6 have each a side 6b directed downwardly forming lateral thrust faces on the transport container 1 for the rams 20. In order to raise the transport container A from the floor (Fig. 1) the electric lift C and the transport container A are brought into the required relative position (as shown in Fig. 1). The support 19 is now moved upwardly in its slide rails, the rams 20 engage the corresponding undersides of the rests 6 of the transport container A which is lifted by the support 19. As soon as the transport container A has entirely left ground it may be carried away by means of the electric lift C. In order to put the raised transport container A onto another transport container B of similar construction, the transport container B and the electric lift are brought into the required relative position after the transport container A has been raised to the necessary height. Then the transport container A is placed onto the lower transport container B by lowering the support 19 in such a way that the pairs of rollers 9 and 10 of the transport container A are seated into the rests 6 of the lower transport container B, the rollers 10 being turned inwards in the above described manner. According to their strength four or more transport containers may be stacks in the above mentioned way. The raising of the upper transport container A from the lower transport container B in order to return the container A to ground takes place as will be easily understood from the foregoing description. In replacing the usual lifting fork by the support 19 which does not project substantially it is possible to manoeuvre the electric lift easily and on a small space, the moving, and especially the turning, of the electric lift alone or with a transport container attached to the support 19 is greatly facilitated. The available stacking space may therefore be fully utilized. Due to the above described manner of stacking, the transport containers remain freely accessible from all directions. The upper transport container has its rollers 10 turned inwardly (Fig. 3) and does not project in the longitudinal direction over the lower transport container thereby increasing the stability of the pile. Since the upper transport container A is supported by means of its pairs of rollers 9 and 10 outside the filling opening on the rests 6 of the lower transport container B, the piece goods in the container 1 of the lower transport container B are not contacted by the upper transport container A and may consequently not be damaged. Because of the bars 7 attached to the front and rear ends of the container 1, the stacking of a transport container on another or lower transport container may be effected in either direction with regard to the front and rear of the containers concerned. The upper inclined side of the bar 7 and the upper inclined sides 6a of the rests 6 facilitate the catching and guiding of the rollers of the transport container to be placed onto another transport container. The lower inclined sides 6b of the rests 6 facilitate the engagement of the rams 20 of the support 19.

Fig. 8 shows the rail 22 and the lifting means 23 of a travelling hoist D. Two similar arms 26 and 27 are attached to the hook of the hoist, which, in turn, is supported by wire ropes to the crab 23. The grab hooks 26a and 27a of the arms 26 and 27 respectively serve the same purpose as the rams 20 of the above described support 19 of the electric lift. The transport container A may be lifted by means of the arms 26 and 27 and transported along the rail 22. The rail 22 may be movable along crane rails extending transversally to the extension of the rail 22.

Of course other equivalent arrangements for lifting, lowering, and transporting the transport containers might be used.

The device for the storage of piece goods according to the invention is suitable for use in weaving mills, or in spooling mills for the transportation and the storage of the wound yarn reels. The reels are collected at the spooling machines then stored and finally worked up at any desired time at another textile machine. The transport containers may of course be used for the storage and the transport of other piece goods.

What I claim is:

1. In a storing device for goods, a plurality of storage containers for the goods, the containers adapted for tiering storage, each container of rectangular horizontal cross-section with vertical side walls, an upper rim for the container, rests projecting outwardly at each corner of the upper rim of each transport container, each rest having an upper rest face for the rollers of another transport container stored above, each rest having an under rest face, lifting means including a ram for engagement with the lower rest face, a buffer for the lifting means for engagement with the side wall of the transport container, two pairs of rollers for each container, at least one pair of the rollers for each container caster-mounted, each caster mounting including two sleeves attached to the transport container, a supporting shaft carried in the two sleeves, a cover forming a thrust face for the shaft on the upper sleeve, an upper cam face on the lower sleeve, and a control pin projecting from the shaft between the sleeves, whereby the control pin is adapted to glide to the lowest portion of the cam face as the shaft slides downwardly in the sleeves upon lifting of the transport container so that the caster-mounted roller turns to a predetermined position to be received in the upper rest face of the transport container thereunder.

2. In a storing device for goods, a plurality of storage containers for the goods, the containers adapted for tiering storage, each container of rectangular horizontal cross-section with vertical side walls, an upper rim for the container, rests projecting outwardly at each corner of the upper rim of the transport containers, each rest having an upper rest face for the rollers of another transport container stored above, two pairs of rollers for each container, at least one pair of the rollers for each container caster-mounted, each caster mounting including two sleeves attached to the transport container, a supporting shaft carried in the two sleeves, a cover forming a thrust face for the shaft on the upper sleeve, an upper cam face on the lower sleeve, and a control pin projecting from the shaft between the sleeves, whereby the control pin is adapted to glide to the lowest portion of the cam face as the shaft slides downwardly in the sleeves upon lifting of the transport container so that the caster-mounted roller turns to a predetermined position to be received in the upper rest face of the transport container thereunder.

3. In a storing device for goods, a plurality of storage containers for the goods, the containers adapted for tiering storage, two pairs of rollers for each container, at least one pair of the rollers caster-mounted, and means in operable connection with the castered rollers automatically turning the castered rollers to a predetermined position when the container is lifted, said means allowing free movement of the castered rollers when the container is supported by the rollers.

References Cited in the file of this patent

UNITED STATES PATENTS

| | | |
|---|---|---|
| 1,742,738 | Turner | Jan. 7, 1930 |
| 1,861,919 | Hill | June 7, 1932 |
| 1,912,847 | Klepel | June 6, 1933 |
| 2,051,627 | Weinmann | Aug. 18, 1936 |